(12) United States Patent
Galbiati et al.

(10) Patent No.: US 7,563,859 B2
(45) Date of Patent: Jul. 21, 2009

US007563859B2

(54) SILANE TERMINATED SULPHYDRIC ACID BASED MICHAEL POLYADDITION POLYMERS

(75) Inventors: Alessandro Galbiati, Vigevano (IT); Paolo Galbiati, Gambolo' (IT)

(73) Assignee: N.P.T. S.R.L., Monteveglio (IT)

( * ) Notice: Subject to any disclaimer, the term of this patent is extended or adjusted under 35 U.S.C. 154(b) by 0 days.

(21) Appl. No.: 10/509,310

(22) PCT Filed: Mar. 26, 2003

(86) PCT No.: PCT/EP03/03126

§ 371 (c)(1), (2), (4) Date: Sep. 27, 2004

(87) PCT Pub. No.: WO03/082958

PCT Pub. Date: Oct. 9, 2003

(65) Prior Publication Data

US 2005/0104041 A1    May 19, 2005

(30) Foreign Application Priority Data

Mar. 28, 2002  (IT)  .......................... MI2002A0654

(51) Int. Cl.
*C08G 75/04* (2006.01)
(52) U.S. Cl. .......................... 528/376; 528/30; 528/391

(58) Field of Classification Search ............ 528/30, 528/376, 391
See application file for complete search history.

(56) References Cited

U.S. PATENT DOCUMENTS

| 3,397,189 A | * | 8/1968 | Erickson ................. 528/364 |
| 3,632,557 A | | 1/1972 | Brode et al. |
| 4,231,956 A | | 11/1980 | Sullivan, III et al. |
| 4,340,707 A | * | 7/1982 | Quis et al. ................. 522/14 |
| 4,426,506 A | | 1/1984 | Blanco |
| 4,857,623 A | | 8/1989 | Emmerling et al. |
| 6,221,994 B1 | * | 4/2001 | Galbiati et al. ............ 528/26 |

FOREIGN PATENT DOCUMENTS

| EP | 031397 A | 7/1981 |
| WO | WO 98/29462 | 7/1998 |

* cited by examiner

*Primary Examiner*—Kuo-Liang Peng
(74) *Attorney, Agent, or Firm*—DeLio & Peterson, LLC; Kelly M. Nowak

(57) ABSTRACT

Terminated silane polymers obtained by addition reactions between an organic silicon derivative and the terminal functional groups of linear or branched polymers obtained by Michael polyaddition reactions of sulphydric acid ($H_2S$) with organic compounds which have at least two alkylenic double bonds activated by the presence, in the alpha position with respect to each alkylenic bond, of an electronegative group.

14 Claims, No Drawings

US 7,563,859 B2

SILANE TERMINATED SULPHYDRIC ACID BASED MICHAEL POLYADDITION POLYMERS

FIELD OF THE INVENTION

The present invention relates to a new type of polymer which is produced by the addition reaction of an appropriate organic derivative of silicon with the terminal functional groups of linear or branched polymers, obtained by the Michael polyaddition reaction between an inorganic compound such as sulphydric acid ($H_2S$) and organic compounds which contain at least two alkylenic double bonds activated by the presence, in the alpha position with respect to each alkylenic double bond, of an electronegative group. Said silane terminated polymer, organic-inorganic hybrid, generated by the alternation of organic and inorganic monomeric components, in conditions of the absence of humidity is stable and has a nature of viscous fluid or fusible solid as a function of the organic monomers and the preselected molecular weight, but simply upon exposure to humid air or upon contact with humidity containing materials, reacts by polymerising by means of a hydrolysis mechanism and successive auto-condensation of the terminal silane groups, converting into a cross linked solid state which can be hard and strong like a resin or elastic and flexible like a rubber. Such polymer constitutes the basis for adhesive compounds and monocomponent hydrosetting sealants and reactive hot-melt resins.

PRIOR ART

The adhesives and sealants sector represents an area in continuous and rapid development due to the progress in materials science and to the resulting request for substances capable of joining two parts, having different or the same nature, without the assistance of mechanical devices. Since, in addition, in recent years the request for non contaminating products has grown, research has for some time been oriented towards the attainment of materials having good mechanical properties, adhesive capacities on different substrates (natural organics, plastics, inorganics, metals) and respect for the working environment. All the volatile organic substances are however still less tolerated, such as for example the solvents or the unreacted monomers, able to release themselves upon application of the product.

Over the last decades, in the monocomponent hydrosetting sealants sector, polyurethane polymers have dominated in virtue of their simplicity of synthesis, of modest costs and their optimal physico-mechanical properties. Today, however, the problem regarding the environment is particularly felt for this type of product, due to the significant concentrations of free monomer which can be present (for example, toluene-di-isocyanate or methylene diphenyl-di-isocyanate).

The monocomponent hydrosetting polymers of the silicone family do not have this problem, but they do not possess any of the particular characteristics of the polyurethanic based systems such as, for example, paintability; they therefore have limited applications in some sectors.

The polysulphuric based materials, other than having an unfavourable bicomponent nature for which they must be mixed with another product at the time of application, are increasingly more difficult to find on the market due to the environmental problems bound to their production and, hence, are increasingly less used.

With the polyurethanic based systems, the problem of noxious free monomers from the chemical point of view has been mainly dealt with the transformation of the isocyanate groups, by exploiting the reactivity towards an appropriate organic function (containing reactive hydrogens) belonging to from alkoxy- or acetoxy-silane species; such species are capable, upon exposure to humidity, of hydrolysing to form silanolic groups and, successively, of auto-condensing to form siloxanic bridges, thus generating, the cross linking of the product and maintaining the hydrosetting monocomponent nature (as examples we cite: Emmerling et al., U.S. Pat. No. 4,857,623; Brode et al. U.S. Pat. No. 3,632,557; Blanco, U.S. Pat. No. 4,426,506). The isocyanate terminated polymers, and therefore also the monomer residues, are transformed into silane terminated systems. The main inconvenience is bound to the transformation of the isocyanic groups into urethane or ureic or thiocarbamic groups with an increase in the number of hydrogen bonds and viscosity. This necessitates the unwelcome presence of solvents in the final product.

Therefore, one can say that the construction technique for silane terminated macromolecules, capable of hydrolysing and auto-condensing, represents a useful method for producing hydrosetting polymers usable in the adhesives and sealants sector.

Silane terminated polyethers are, in addition, known in the art (Isayama et al. U.S. Pat. No. 3,971,751; Takase et al. U.S. Pat. No. 4,444,974).

Also known in the art are silane terminated polymers obtained by the addition reaction of an organofunctional silicon compound having hydrolysable groups on the terminal functional groups of the Michael polyaddition polymers (Galbiati et al. U.S. Pat. No. 6,221,994 in the name of the applicant). More precisely, are described silane terminated polymers obtained by the Michael polyaddition reaction of organic compounds which contain at least two reactive hydrogens on organic compounds which contain at least two ethylenic double bonds activated by the presence, in the alpha positions of each ethylenic bond, of an electronegative group. Still more in particular, are described polymers having repeated structural units containing the β-thioether-ester bonds obtained by the reaction of dithiols with dimethacrylates. Said silane terminated polymers are the basis for hydrosetting monocomponent adhesive and sealant products.

The Michael polyaddition polymers obtained by the reaction of bifunctional nucleophilic organic molecules, such as for example the diols, the diamines and the dithiols, with organic molecules having double bonds activated by electronegative groups in the alpha positions in alkylenic bonds, such as for example the diacrylic derivatives, the dimethacrylics, the dinitro olefins, the divinyl sulphones and the divinyl sulphoxides are well known in the art (Bayer, O. *Angew. Chem.* 61, 229, 1949; Hulse, U.S. Pat. No. 2,759,913; Nuyken et al. *Makromol. Chem.* 191, 2465, 1990). The molecular weight of said linear polymers is a function of the ratio between the bifunctional monomer reagents and then, therefore, can be preselected as a function of the ratio itself, whilst the terminal functional groups are preselected from amongst those of one of the two monomeric species and, more precisely, are those of the species in excess. Since the reaction has the characteristics of a step reaction at the total conversion of the product in defect the Mean Numerical Degree of Polymerisation, $<P_n>$, is given by: $<P_n>=(1+r)/(1-r)$, where r represents the ratio between the amount of monomer in defect and that in excess and, hence, the molecular weight depends only on r. When r=1, theoretically, one obtains the cyclic chain with the absence of functional groups useful for the successive silanisation, whilst when r≠1 the molecular weight is directly derived from the ratio r selected and the polymers obtained have the monomer terminal groups in excess.

In the case in which monomers having functionality greater then two are used to produce a polyfunctional step polymerisation, for example of the type:

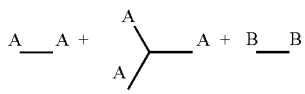

it is possible to produce polymers with different branching coefficient, α, as a function of the functionality, f, of the branching species and the initial of proportions between the different species, and that is as a function of the ratio r' between the number of functional groups A and B initially present and of ρ, which represents the fraction of A groups belonging to the branching unit ($A_{branching\ unit}/A_{total}$). In fact on total conversion of the BB in defect monomer one has:

$\alpha = \rho/(r'-1+\rho)$ whilst the mean numerical polymerisation degree is given by:

$<P_n> = [f(1-\rho+1/r')+2\rho]/[f(1-\rho+1/r'-2p_a)+2\rho]$ where $p_a$ is the fraction of the A groups which have reacted.

For polymers useful for successive silanisation it is desirable that α do not over exceed the critical value $\alpha_c$, that is the Gelling Point, beyond which one has a rapid transformation of the reaction mixture from viscous liquid to elastic material with infinite viscosity, insoluble in all non degrading solvents.

Therefore Michael polyaddition represents, a good method for the synthesis of telechelic polymers, having pre-established terminal functional groups and molecular weight, and, in the case of the use of monomers having more than two useful functional groups per molecule, having pre-established degree of branching; in addition, as a function of the supply of the monomers to the reactor, it is possible to control the distribution of molecular weights. As a consequence, it represents a good method to prepare polymers useful for successive silanisation, the subject of this patent.

Polymers having a thioether nature are useful in as much as the introduction of sulphur groups into the chain imparts particular physico-chemical characteristics, such as for example greater stability to solvents and to petrols. Polymers having β-thioether-ester nature are particularly useful since, in addition to that expressed above, the ester bonds represent a simple way for the synthesis of species having activated double bonds and, more precisely, of α,β-unsaturated carbonylic species. As a consequence this combination is particularly advantageous, both with regard to the final properties of the product, and in terms of the production of the material itself.

However, the silane terminated polymers cited in the U.S. Pat. No. 6,221,994, prepared from dithiols and organic compounds which contain at least two activated double bonds, suffer from the serious problem bound to olfactory perception, possessing unpleasant odours (typical of rotten eggs) which make successive working problematic and which, persist into the final product, not favouring their commercialisation.

The olfactory problem can be explained by considering the organic nature of the dithiols, of the impurities contained in them, of the by-products which can be generated in reaction environment, as well as considering the peculiarity of the SH group.

Thiols possess an extremely offensive odour for which the human nose has a very low detection threshold, in the order of parts per billion (ppb); for example the atmospheric detection thresholds of methyl-mercaptan and ethyl-mercaptan are around 1 ppb. In addition they are easily oxidised to disulphurs by mild oxidising agents or by atmospheric oxygen in the presence of for example amines as catalysts, according to the following scheme:

The alkyl sulphides (R—S—R), disulphides (R—S—S—R) and poly sulphides (R—$S_n$—R) are odorous liquids, more or less like the thiols. The atmospheric detection threshold of dimethyl-sulphide is equal to 1 ppb, that of diethyl-sulphide of 0.25 ppb, whilst dimethyl-disulphide is only slightly less odorous of the corresponding methyl-mercaptan, and the poly sulphide Me-$(S)_{2-4}$-Me has a threshold equal to that of methyl-mercaptan.

The industrial synthetic pathways of the thiols exploit the transformation of the corresponding alcohols or terminal alkenes with sulphydric acid, according to the scheme:

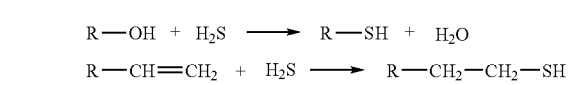

An additional synthetic pathway, even if of minor industrial importance, envisages the transformation of the corresponding halogen derivatives through reaction with the monosodium salts of sulphydric acid (NaSH), according to a nucleophilic substitution scheme:

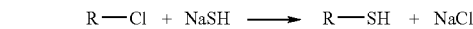

In all these syntheses, as it can be observed from an analysis of the patent literature, the main problem is the formation of the corresponding dialkyl-sulphides, since the RSH species formed can condense with the hydroxyl groups or addition further with the non reacted double bonds, or can undergo further nucleophilic substitutions on the halogen. Other by-products, obtained through oxidation, are the dialkyl-disulphides, also these possessing extremely unpleasant odours.

In addition to these considerations it should be born in mind that the S—H bond is capable of significant formation of hydrogen bonds.

These considerations lead to the following conclusions, capable of explaining the presence of residual odours:

a) even preparing the Michael polyaddition polymers lacking in dithiols with respect to the species having two activated double bonds and reaching the maximum conversion of the SH groups ([SH]~0 according to traditional analytical methods), one obtains small quantities of unreacted dithiols which, even being negligible from the point of view of the properties of the polymer, are able to generate an unpleasant odour; such amounts are eliminated with difficulty, even at low pressures, due to the presence of hydrogen bonds between the SH group, the oxygen of the carbonylic group and the sulphur of the β-thioether-ester structure, the problem is aggravated by the viscous nature of the polymer. The odour generated by the monomer residue remains unaltered during the successive silanisation step since the reaction involves the use of an organo-silane species having a nucleophilic functional group with active hydrogens and, therefore, inactive towards the mercaptan species;

b) the odour emitting organo-sulphuric and cyclic disulphuric impurities which can be contained within the dithiols and which are bound to the methods of preparation are chemically inactive to the reactions involved in the synthesis cycle of the polymers forming the subject of the patent;

c) as reported in the examples in U.S. Pat. No. 6,221,994, the favoured environment for the Michael polyaddition reaction between dithiols and organic species having two activated double bonds, and more precisely between dithiols and diacrylic and dimethacrylic species to generate the β-thiother-ester structure, contemplates the presence of tertiary amines such as, for example, triethyl-amine able to generate the nucleophilic mercaptide ions species, the active species in the Michael addition. Therefore the environment favours giving rise to secondary reactions, such the formation by oxidative routes of organic disulphides, chemically inactive in the successive silanisation step;

d) it is also considered that possible dithiol impurities, mono-functional in nature, are difficult to trace and to separate, and are able to act as such chain terminating agents resulting in a block in the growth of the chain and a reduction of the molecular weights with respect to the values pre-established on the basis of the ratio between the amounts of the monomers.

The need to obtain silane terminated Michael polyaddition polymers with β-thioether structures, avoiding the above listed inconveniences through the use of dithiols was therefore felt.

SUMMARY OF THE INVENTION

The applicant has surprisingly and unexpectedly found that, a new silane terminated polymer obtained by the addition reaction between an organic derivative of silicon and the terminal functional groups of Michael polyaddition polymers obtained by the reaction of organic compounds which contain at least two alkylenic double bonds activated by the presence, in the alpha positions of each alkylenic bond, of an electronegative group with an inorganic compound such as sulphydric acid and able to convert from, a viscous fluid or fusible solid state into a cross-linked and insoluble solid state which can be hard and resistant like a resin or soft and flexible like a rubber, does not present the inconveniences of the unpleasant smells of the silane terminated polymers obtained by Michael polyaddition with mercaptans.

DETAILED DESCRIPTION OF THE INVENTION

The subject of the present invention is therefore constituted by a silane terminated polymer obtained by the addition reaction between an organic silicon derivative and the terminal functional groups of linear or branched polymers obtained by the Michael polyaddition reaction of sulphydric acid ($H_2S$) with organic compounds which have at least two double alkylenic bonds activated by the presence, in the alpha position with, respect to each alkylenic bond, of an electronegative group.

In a preferred embodiment of the present invention the organic silicon derivative has the following general formula:

with a=0, 1, 2; b=0, 1 and wherein:

X=selected from the group consisting of halogen, alkoxy, acyloxy, ketoxime, amine, amide and mercaptan radicals;

$R^1$=monovalent hydrocarbon group;

$R^2$=bivalent substituent selected from the group consisting of hydrocarbon, ether-hydrocarbon, amino-hydrocarbon radicals;

Z=substituent selected from the group consisting of:

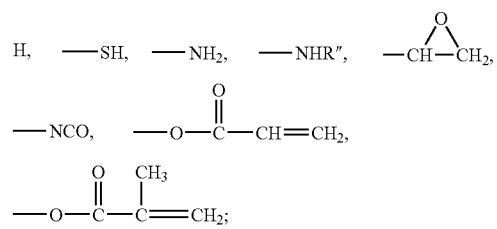

wherein R" represents a monovalent hydrocarbon group.

The structures of the linear Michael polyaddition polymers useful for being silanated according to the present invention, prepared from monomers having two activated double bonds and $H_2S$, and characterised by different terminal functional groups as a function of the ratio between the monomers, can be represented as in scheme (2) and scheme (3).

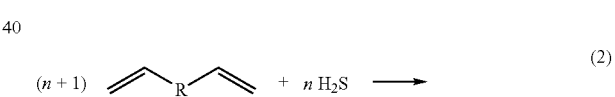

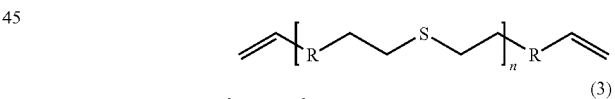

wherein:

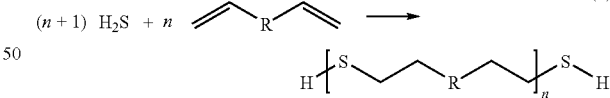

is any organic compound having two activated double bonds and n is an integer greater than or equal to 1.

Further examples of structures of the branched Michael polyaddition polymers useful for being silanated according to the present invention, prepared from at least one monomer having more than two activated double bonds and $H_2S$, and characterised by different terminal functional groups as a function of the ratio between the monomers, can be represented in an exemplified manner. (which does not wish to and cannot correspond to reality) as in scheme (4) and scheme (5).

(4)

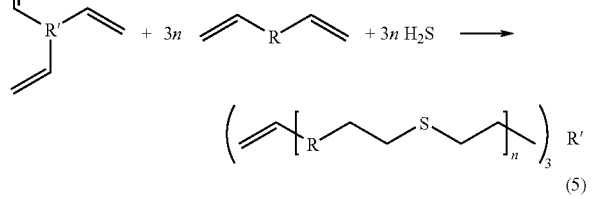

(5)

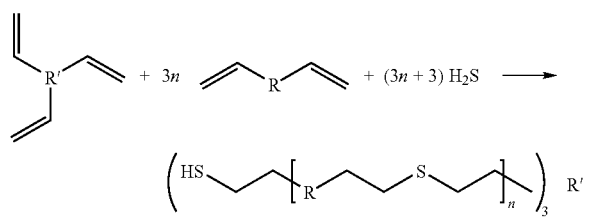

wherein:

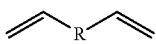

is any organic compound having two activated double bonds and n is an integer greater than or equal to 1.

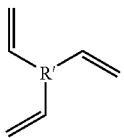

is any organic compound having three activated double bonds and n is an integer greater than or equal to 1.

Not reported herein, for the obvious difficulties bound to the graphical representation, are all the branched structures obtainable with monomers-having activated double bonds in numbers greater than two and with the combinations of monomers With functionalities greater than two with monomers with functionalities equal to or greater than two. It is evident, however, that for the purpose of this patent any combination of monomers with different degree of functionality able to produce a viscous fluid polymer is useful (at any temperature and below, accordingly, to its gelling point) having terminal functional groups useful for the successive silanisation with organic derivatives of silicon, preferably with the silanes of formula (1).

The mean numerical molecular weights of such polymers are pre-selected as a function of the ratio between the monomers and are selected as a function of the nature of the monomers themselves and of the final use to which the polymer is destined. Such values can be comprised of between 200 Daltons and 60000 Daltons.

In particular, the silane terminated polymers which one obtains by reacting the polyaddition polymers as described above with an organic compound of silicon, according to the present invention, in which the organic compound of silicon has the general formula (1), and that are a further subject of the present invention, are characterised by the following terminal structures, which for reasons of simplicity are represented, herein only by the linear polymers:

(6)

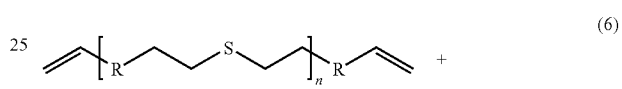

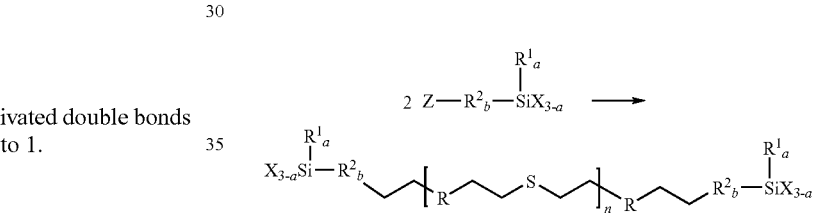

with Z=H;

and wherein R, $R^2$, $R^1$ and X have the same meaning as indicated in the general formulas (1), (2) and (3); a=0,1,2; b=0,1;

(7)

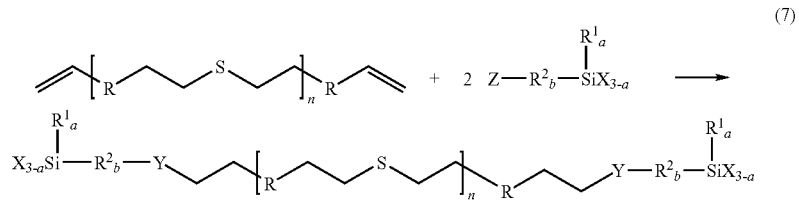

with Z=SH, $NH_2$, NHR" and Y=S, NH, NR";

and wherein R, R", $R^2$, $R^1$ and X have the same meaning as indicated in the general formulas (1), (2) and (3); a=0,1,2; b=0,1;

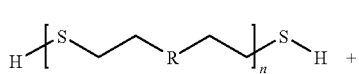

-continued

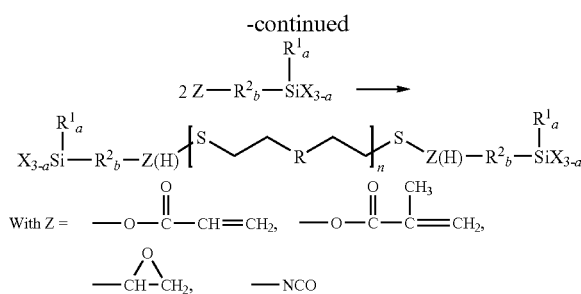

and wherein R, $R^2$, $R^1$ and X have the same meaning as indicated in the general formulas (1), (2) and (3); a=0,1,2; b=0,1.

Preferably, the organic compounds of silicon of formula (1) are selected from the group consisting of:
(Isocyanate alkyl)alkoxysilanes:

$$O=C=N-R^3-Si(R^4)_a(OR^5)_{3-a} \quad (1a)$$

(Aminoalkyl)alkoxysilanes:

$$H_2N-R^3-Si(R^4)_a(OR^5)_{3-a} \quad (1b)$$

(Glycidoxyalkyl)alkoxysilanes:

$$O[CH_2-CH]-CH_2-O-R^3-Si(R^4)_a(OR^5)_{3-a} \quad (1c)$$

(Mercaptoalkyl)alkoxysilanes:

$$HS-R^3-Si(R^4)_a(OR^5)_{3-a} \quad (1d)$$

([meth]acrylate alkyl)alkoxysilanes:

$$CH_2=C(R^6)-COO-R^3-Si(R^4)_a(OR^5)_{3-a}, \quad (1e).$$

wherein:
$R^3$=divalent alkyl radical containing from 1 to 8 carbon atoms;
$R^4$ and $R^5$=alkyl radicals containing from 1 to 4 carbon atoms;
$R^6$=H or $CH_3$;
a=0,1,2.

In a particularly preferred embodiment of the present invention the organic compounds of silicon of formula (1) are selected from the group consisting of:
(3-mercaptopropyl)trimethoxysilane;
(3-mercaptopropyl)methyldimethoxysilane:
(3-[meth]acryloxypropyl)trimethoxysilane;
(N-nButyl,3-aminopropyl)trimethoxysilane;
(N-Ethyl,3-aminoisobutyl)methyldiethoxysilane;
(3-glycidoxypropyl)trimethoxysilane.

In a preferred embodiment of the present invention, the organic compounds useful for Michael polyaddition, having at least two activated double bonds, are selected from the group consisting of:

$$W'[-C(R^7)=CH_2]_2 \quad (9)$$

$$Q[-W-C(R^7)=CH_2]_2 \quad (9a)$$

$$Q[-W-C(R^7)=CH_2]_3 \quad (9b)$$

$$Q[-W-C(R^7)=CH_2]_4 \quad (9c)$$

wherein:
W'=electron-attractor group selected from the groups consisting of:
—SO—, —$SO_2$—, —O—, —CO—;

W=electron-attractor group selected from the group consisting of:
—SO—; —$SO_2$—, —O—, —CO—, —O—CO—;
$R^7$=—H or —$CH_3$;
Q=divalent, trivalent or tetravalent group selected from the group consisting of hydrocarbon radicals, hetero-hydrocarbons, polyethers, polyesters, which can contain a repeating unit and hence have variable molecular weight;

In a particularly preferred embodiment the acrylic and/or methacrylic organic compounds have the general formulas:

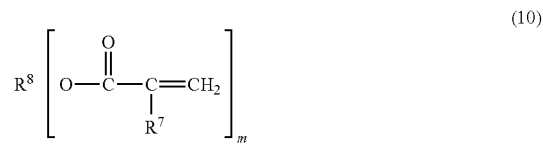

(10)

wherein m=2, 3, 4; $R^7$=H or $CH_3$; $R^8$ is selected from the group consisting of: di-, tri- or tetra-valent polyethers which consist essentially of a —$OR^9$— chemically combined unit, wherein $R^9$ is a divalent alkyl group having from 2 to 4 carbon atoms; di-, tri- or tetra-valent linear or branched aliphatic alkyl radicals, preferably from 1 to 50 carbon atoms; di-, tri- or tetra-valent aromatic radicals, preferably from 6 to 200 carbon atoms; di-, tri- or tetra-valent linear or branched aryl radicals, preferably from 6 to 200 carbon atoms or $R^8$ is one or more combinations of said polyethers, alkyl radicals, aromatic radicals and aryl radicals.

Amongst the organic compounds having at least two activated alkylenic bonds one can mention for the purposes of example the following structures:
$H_2C=C(R^7)-SO_2-C(R^7)=CH_2$,
$H_2C=C(R^7)-SO-C(R^7)=CH_2$,
$H_2C=C(R^7)-O-C(R^7)=CH_2$,
$CH_3CH_2C[CH_2O-CO-C(R^7)=CH_2]_3$,
$C[CH_2O-CO-C(R^7)=CH_2]_4$,
$O\{CH_2C(C_2H_5)(CH_2O-CO-C(R^7)=CH_2)_2\}_2$,
$H_2C=C(R^7)-CO-O-Ph-C(CH_3)_2-Ph-O-CO-C(R^7)=CH_2$,
$H_2C=C(R^7)-CO-OCH_2CH_2O-CO-C(R^7)=CH_2$,
$H_2C=C(R^7)-CO-OCH_2CH(CH_3)CH_2O-CO-C(R^7)=CH_2$,
$C[CH_2[OCH_2CH(CH_3)]_nOCOC(R^7)=CH_2]_4$,
$H_2C=C(R^7)-CO-O(CH_2CH_2O)_n-CO-C(R^7)=CH_2$,
$H_2C=C(R^7)-CO-O[CH_2CH(CH_3)O]_n-CO-C(R^7)=CH_2$,
$CH\{CH_2O[CH_2CH(CH_3)O]_n-CO-C(R^7)=CH_2\}_3$,
$H_2C=CH-SO_2-(CH_2CH_2O)_n-CH_2CH_2-SO_2-CH=CH_2$
$H_2C=C(R^7)-CO-O-[R-O-CO-R'-CO-O]_n-R-O-CO-C(R^7)=CH_2$, wherein: $R^7$=H or $CH_3$; R and R'=alkyl or aryl radicals.

Preferably, the organic compounds useful for Michael poly addition, having at least two activated double bonds, are selected from the group consisting of: di-, tri-, tetra-acrylates; di-, tri- and tetra-methacrylates; di-, tri- and tetra-vinyisulphones. Amongst the di-acrylate and di-methacryliate organic compounds the most preferred according to the present invention are selected from the group consisting of: compounds of general formula (11)

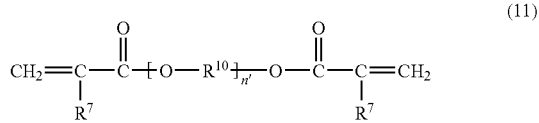
(11)

wherein:

$R^7$=H or $CH_3$; $R^{10}$=selected from the group consisting of —$CH_2$—$CH(CH_3)$—, —$CH_2$—$CH_2$—, —$CH_2$—$CH_2$—$CH_2$—CH; —$CH_2$—$CH(CH_3)$—$CH_2$—; n'=an integer comprised of between 1 and 400, preferably between 1 and 200, still more preferably between 1 and 50;

compounds of formula (12):

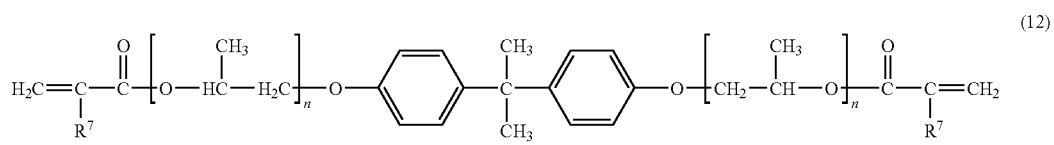
(12)

wherein n=is an integer comprised of between 0 and 10 and $R^7$ is H or $CH_3$.

Absolutely preferred between the compounds of formula (11) are the compounds in which $R^7$ is hydrogen and $R^{10}$ is —$CH_2$—$CH(CH_3)$—, i.e. the polyisopropylenglycolidiacrylates.

Amongst the tri-acrylate and tri-methacrylate organic compounds the preferred are:

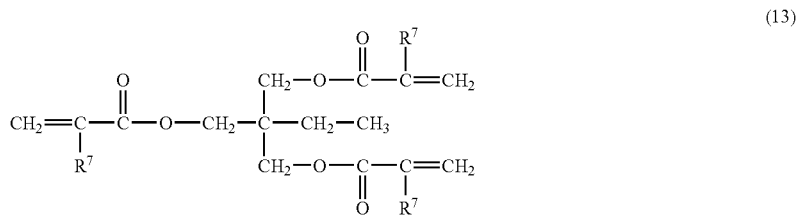
(13)

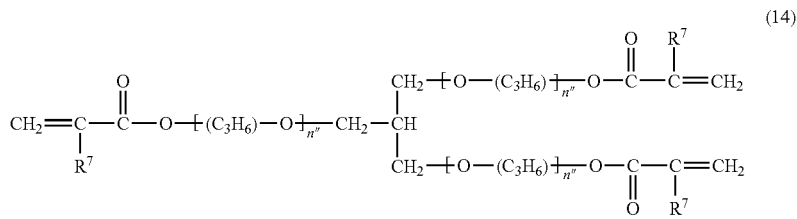
(14)

wherein:

$R^7$=H or $CH_3$; n''=an integer comprised of between 0 and 400, preferably between 0 and 200, still more preferably between 0 and 50.

Amongst the vinyl-sulphonic the preferred are:

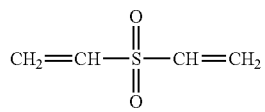

(15)

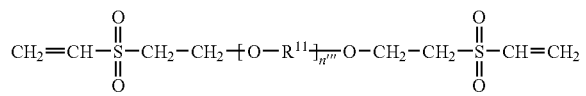

(16)

wherein: $R^{11}$ is selected from the group consisting of —$CH_2$—$CH(CH_3)$—, —$CH_2$—$CH_2$—, —$CH_2$—$CH_2$—$CH_2$—$CH_2$—; —$CH_2$—$CH(CH_3)$—$CH_2$—; n'''=an integer comprised of between 0 and 400, preferably between 0 and 200, still more preferably between 0 and 50.

The structures of the linear Michael polyaddition polymers useful for being silanated, prepared from diacrylates or dimethacrylates, or from divinylsulphones, and $H_2S$, and characterised by different terminal functional groups as a function of the ratio between the monomers, can be represented as in the scheme (17), scheme (18), schemes (19) and (20).

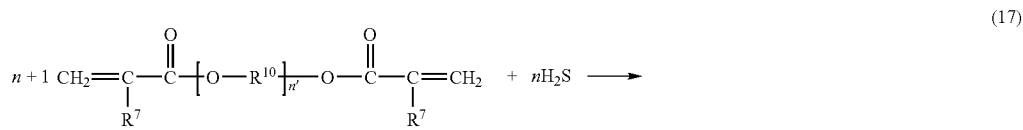

(17)

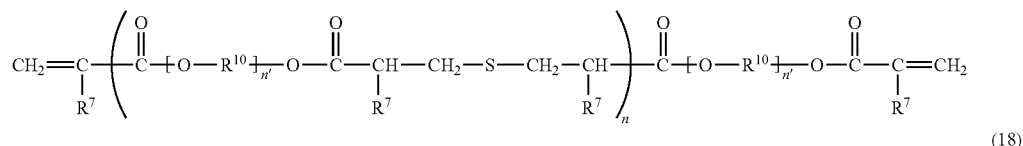

(18)

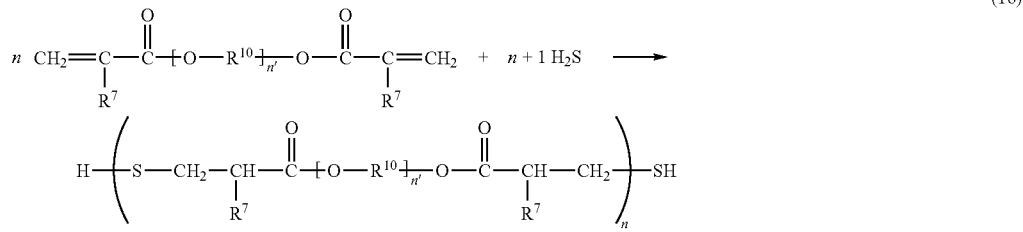

(19)

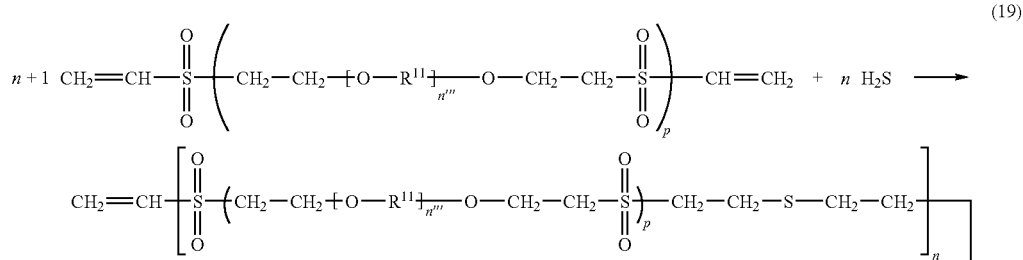

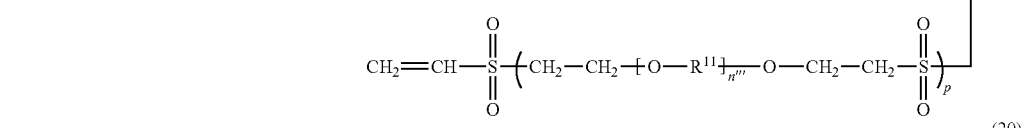

(20)

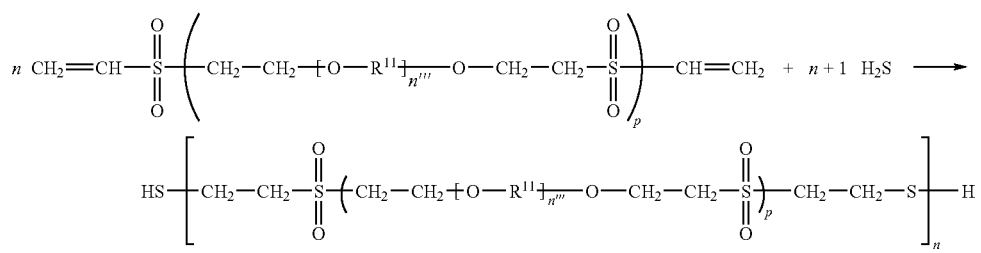

wherein: $R^7$, $R^{10}$, $R^{11}$, n, n' and n''' maintain the same meaning as indicated above and p=0.1.

Not reported herein for obvious reasons bound to the difficulties of graphical representation, are all the branched structures obtainable with monomers having activated double bonds in numbers greater than two and with the combinations of monomers with functionality greater than two with monomers with functionality equal to or greater than two. It is evident, however, that in agreement with the present invention and with the final properties of the material, any combination of monomers of different nature and different degree of functionality able to produce a viscous fluid polymer (at any temperature; below, then, its gelling point having terminal functional groups useful for successive silanisation is useful, preferably with silanes of the structure (1).

The silane terminated polymers, subject of the present invention can be represented, as a means of example which should not be seen as exhaustive with respect to all the exposed combinations and subject of the present invention, as in scheme (21) and scheme (22), by reacting the polyaddition polymers (17) and (18) with the silanes (1d) and (1e).

particular classes of organic compounds which have at least two activated alkylenic double bonds, in the process of synthesising a silane terminated polymer obtained by Michael polyaddition reaction.

Such monomer is a diprotic inorganic acid and, under basic catalytic conditions such as these generated, for example, by tertiary amines, is able to behave as a bifunctional species in the Michael polyaddition.

With the present invention the structure of the repeating structural unit is therefore modified from β-thioethers-[activating group] (example, β-thioethers-esters) as are possible from all the possible combinations of the structures reported by U.S. Pat. No. 6,221,994, becoming β-thioethers-[activating group]$_2$ (e.g., β-thioethers-diesters) since only a single sulphur atom is present in the beta position of the two activating groups, and the organic portion present between two S atoms is eliminated; that is clarified by the following structures:

—X'—C—C$^β$—S—R—S—C$^β$—C—X'—  (U.S. Pat. No. 6,221,994)

—X'—C—C$^β$—S—C$^β$—C—X'—  (present invention)

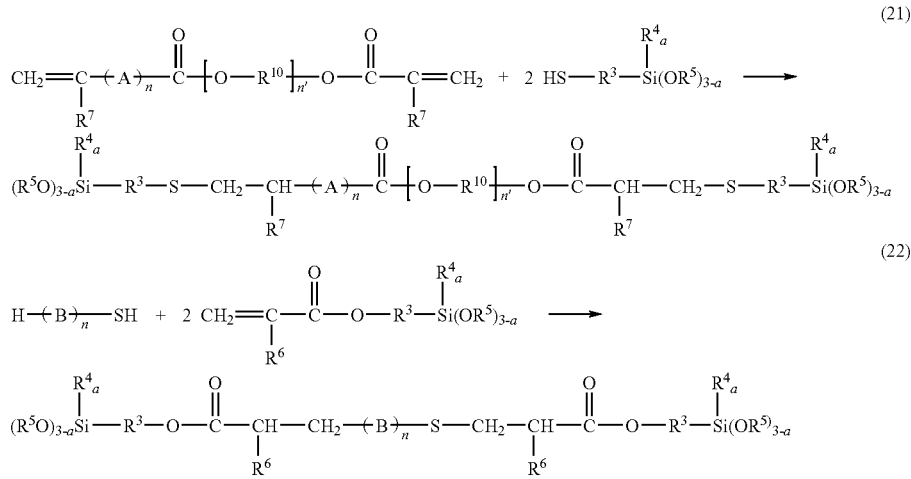

(21)

(22)

wherein:

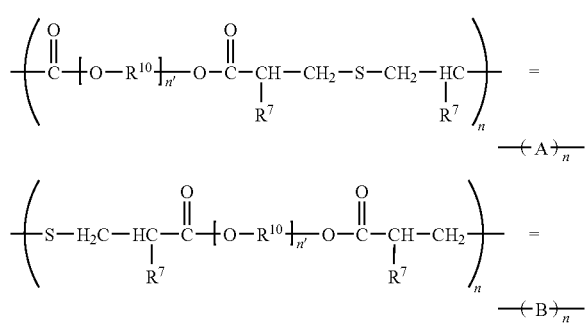

and $R^3$, $R^4$, $R^5$, $R^6$, $R^7$, $R^{10}$, a, n and n' maintain the same meaning as indicated above.

The present invention consists in the use of a monomer having an inorganic nature, such as sulphydric acid ($H_2S$), in place of the organic compounds having two active hydrogens described in the U.S. Pat. No. 6,221,994, preferably with wherein X'=activating group, R=organic portion, C$^β$=carbon in position β with respect to the activating group.

Sulphydric acid, having a somewhat low atmospheric perceptibility threshold (10-20 ppb), overcomes the problems related to the odours of the final polymer thanks to the following properties:

a) in the case of the presence of residual quantities of unreacted monomer, it is easily removed at low pressure from the viscous mass thanks to its gaseous inorganic nature at environment temperature and pressure ($T_{eb}$=−60,3° C.);

b) the impurities which can be present in the sulphydric acid are not sulphuric or disulphuric organic type having extremely unpleasant odours (such as however in the case of the dithiols), since the industrial synthesis envisages the reaction starting from heating hydrogen and sulphur, according to the scheme:

A typical composition of $H_2S$ at 99.5% vol can include the presence of maximal concentrations of the following substances: $H_2O=0.001\%$, $CO_2=0.01\%$, $COS=0.2\%$, $CS_2=0.2\%$, $CH_4=0.05\%$, $N_2=0.05\%$; in addition it can contain traces of $H_2$;

b) possible oxidation products (e.g. $SO_2$, $SO_3$) which can be generated during the Michael polyaddition have inorganic gaseous nature and do not possess repugnant odours such as the organic oxidation products obtained from the thiols (sulphurs, disulphurs); in addition they are spontaneously liberated from the reaction mass or are however easily removable at low pressure;

c) the diprotic nature of the gaseous $H_2S$ species is able to ensure the dual-functionality of the monomer in the Michael polyaddition, guaranteeing high correspondence between the molecular weight predetermined by the ratio between the monomers and the molecular weight obtained experimentally. That is not obvious in the case of the thiols for which monofunctional species can be present, particularly on products for industrial use which can have purity of less than 98% in weight.

A further object of the present invention is constituted by the synthesis process for a silane terminated polymer obtained by the addition reaction between an organic derivative of silicon and the terminal functional groups of linear or branched polymers obtained by the Michael polyaddition reaction of sulphydric acid ($H_2S$) with organic compounds which have at least two alkylenic double bonds activated by the presence, in the alpha position with respect to each alkylenic bond, of an electronegative group, the process in which the Michael addition reactions are catalysed by organic bases, preferably tertiary amines, more preferably tertiary amines selected from the group consisting of: triethylamine, 1,8-diazadicyclo[5.4.0.]undecene-7 (DBU), 1,4-diazadicyclo[2.2.2]octane (DABCO). Regarding this invention all the polymers, obtained with a ratio between the quantities of the monomers having activated double bonds (pure or mixed with species with different nature and different functionality) and the $H_2S$ monomer such as to guarantee the presence of the free functional groups necessary for the successive silanisation, are useful, making dependent the selection of the nature and the number of the functionalities and the ratio of $H_2S$ on the final use to which the polymer itself is addressed, on preselected terminal functional group type and molecular weight, as well as, on the preselected degree of branching.

According to the present invention the silanated polymers, obtained by the Michael polyaddition of an inorganic compound such as sulphydric acid and organic compounds having at least two activated alkylenic double bonds, by simple exposure to atmospheric humidity, and without the further additions of other reactive substances, completely cross-link passing from the fluid state (at a certain temperature) to that of an insoluble solid.

With that aim the Michael polyaddition polymers between $H_2S$ and organic compounds according to the present invention, are made to react with organic derivatives of silicon, preferably the silicon organic compounds of formula (1), which carry both a reactive functional group suitable to react with the terminal functional group of the polyaddition polymer, and appropriate, easily hydrolysable and condensable groups. The silane terminated polymers thus obtained are stable and maintain their viscous fluid or fusible solid state in anhydrous conditions, whilst, if exposed to atmospheric humidity, they transform into solid materials insoluble in any non degrading solvent following cross linking generated by the hydrolysis and successive auto-condensation of the silanolic groups on the terminal silicon atoms. Such cross linking mechanism is known and amply described in the art.

More particularly, according to the present invention, the Michael polyaddition polymers are all these functionalised at the extremities, linear or branched, obtainable by the Michael polyaddition reaction between sulphydric acid and organic compounds having at least two activated alkylenic double bonds, making dependent the selection of the nature of the monomers, of their functionality and of their molecular weight (in the case of the presence of repeating units) on the final properties of the polymer; in addition making the selection of the ratio between the quantities of sulphydric acid ($H_2S$) and of the organic monomers dependent on the preselected type of terminal functional group and molecular weight of the polymer, as well as making the selection of the nature of the silane compound dependent on the type of terminal functional group of the polyaddition polymer and the functionality of said silane compound on the degree of cross linking in the final materials, once the passage from viscous fluid or fusible solid to insoluble cross linked solid is undergone by exposure to humidity.

In solvent free systems the mean molecular weight of the Michael polyaddition polymer is comprised between the minimum obtainable as a function of the preselected organic monomers and a maximum of around 70000. Higher molecular weights could determine viscosity too high for practical use. In the presence of solvents the molecular weight of. 70000 can be exceeded, if the terminal functional groups are present in numbers such as to obtain, following reaction with the, appropriate silane functional groups, a sufficiently high percentage of, terminal silane groups and therefore a structure with a useful degree of cross linking following vulcanisation by exposure to humidity.

Since the speed of the hydrolysis reaction of the alkoxysilane groups and the condensation of the silanols which results in the cross linking of the silane terminated. Michael polyaddition polymers is moderate, it is generally preferable, even if not strictly necessary, to use a catalyst. Any catalyst of hydrolysis and condensation of the silanols can be used. Examples of such compounds are the metallic salts of carboxylic acids such as dibutyl tin dilaurate, tin octoate and the like, organic titanium derivatives such as the alkyl titanates and the like, and every other acid or basic catalyst. The amount of catalyst is preferably comprised of between 0.1 and 10 partsin weight per 100 parts in weight of polymer.

The silane terminated polymers according to the present invention can be treated with loads normally used in the field, of polymers; for example reinforcing loads such as: pyrogenic silica, precipitated silica or carbon black; or non reinforcing loads such as: precipitated or ground calcium carbonate, magnesium carbonate, kaolin, talc, titanium oxide, iron oxides, zinc oxides or mixtures thereof, fibrous organic or inorganic materials. Furthermore, all the loads well known in the rubber industry sector can be used in addition to these cited above, singularly or in mixtures, each conferring their individual characteristics onto the polymer. The choice between the different loads must be carried out taking into account the mechanical properties (elongation to rupture, breakage load, hardness, resistance, elasticity, etc.) required of the final product, not forgetting the rheological characteristics of the product prior to vulcanisation (viscosity, density, flow, thixotropy, etc.).

Together with the mineral loads, the silane terminated polymers according to the present invention can also be modified with plasticisers, generally used to modify the mechanical and Theological properties of the final product. The fundamental requirement of the plasticiser used is its compatibility with the polymer. Only partially compatible plasticisers are expelled over a variable period of time depending on the degree of compatibility, giving rise to unmixing phenomena prior to vulcanisation and exudation following vulcanisation. Every plasticiser known in the art is compatible with the silane terminated Michael polyaddition polymers according to the present invention. Amongst the plasticisers in particular are considered the phthalic acid esters, the adipic acid esters, the phosphoric esters, the epoxidated soya oils, the chlorinated paraffins.

In addition to the loads and the plasticisers such as these above, other additives can be used in mixtures with the polymers of this invention: pigments, antioxidants, UV stabilisers, thixotropic additives, additives to improve adhesion, in particular the phenolic resins and the epoxidic resins.

Since the silane terminated polymers are particularly sensitive to humidity, the loads, the plasticisers, the other additives such as these above and in general all the products which are added must be dehydrated prior to use.

Some examples are reported below for non limiting illustration of the present invention.

EXAMPLE 1

In a pressure reactor, 57.2 g (28.30 mmol) of a polyoxypropyleneglycol diacrylate having a mean numerical molecular weight $<M_n>$ equal to 2021 g/mole are mixed with 0.857 g (25.15 mmol) of sulphydric acid (34.08 g/mole) in the presence of diaza bicyclo undecene DBU (0.1% by weight). It is left to react with agitation at a temperature of 70° C. until the complete conversion of the mercaptan groups.

The linear Michael polyaddition polymer (A) thus obtained has terminal double bonds ($^1$H-NMR analysis), viscosity at 23° C. ($\eta_{23°\ C.}$) equal to 98 Pa·s and mean numerical molecular weight equal to 18200 g/mole, values determined by titration with n-dodecylmercaptan. The product, following treatment at 50° C. at reduced pressure for a few minutes, is completely odourless.

The synthesis of the silane terminated Michael polyaddition polymer is carried out with agitation under a nitrogen atmosphere by adding 27.48 g of (A) (1.51 mmol) 0.59 g (3.02 mmol) of 3-mercaptopropyl trimethoxy silane (196.34 g/mole) and approx. 0.1% in weight of DBU. The mixture is maintained at a temperature of 50° C. for 5 hours until the quantitative disappearance of the acrylic double bonds determined by $^1$H-NMR analysis. The NMR spectrum is consistent with the structure and does not show the presence of secondary reactions.

The product obtained has a viscosity equal to 160 Pa·s and has only a slight odour.

The polymer placed in a metallic container under an atmosphere of nitrogen is maintained in viscous liquid form for several days and, that is, in a state useful for; the successive formulations.

EXAMPLE 2

In a pressure reactor, 53.7 g (26.57 mmol) of a polyoxypropylene glycol diacrylate ($<M_n>$=2021 g/mole) are mixed with 0.81 g (23.77 mmol) of sulphydric acid and 10.7 g of a plasticiser (adipate) in the presence of DBU (0.1% in weight). It is left to react with agitation for approx. 8 hours at a temperature of 70° C.

The product thus obtained (B) has $\eta_{23°\ C.}$=15 Pa·s and $<M_n>$=18400 g/mole. Following degassing at low pressure it is completely odourless.

To 52.5 g (2.86 mmol) of the polymer (B) are added 1.12 g (5.72 mmol) of 3-mercaptopropyltrimethoxy silane (196.34 g/mole) and approx. 0.1% in weight of DBU. The reaction proceeds with agitation under an inert atmosphere at T=50° C. for 5 hours until the quantitative disappearance of the double bonds.

The product obtained has $\eta_{23°\ C.}$=100 Pa·s and has only a slight odour.

EXAMPLE 3

In un pressure reactor, 1550.27 g (0.5729 mol) of a polyoxypropyleneglycol diacrylate ($<M_n>$=2706 g/mole) are mixed with 17.35 g (0.5091 mol) of sulphydric acid in approx. 1.5 kg of toluene and in the presence of triethylamine (2% by weight). It is left to react for approx. 10 hours at a temperature of 75° C. until the complete conversion of the mercaptan groups. The solvent is eliminated by evaporation under reduced pressure.

The product thus obtained (C) has $\eta_{23°\ C.}$=47.1 Pa·s and $<M_n>$=14100 g/mole and is completely odourless.

To 23.22 g (1.65 mmol) of (C) are added 0.647 g (3.30 mmol), of 3-mercaptopropyltrimethoxy silane (196.34 g/mole) and approx. 2% in weight of triethylamine, with agitation under an atmosphere of nitrogen. The reaction is carried out, at a temperature of 50° C. for 7 hours until the quantitative disappearance of the double bonds.

The product obtained has $\eta_{23°\ C.}$=147 Pa·s and has only a slight odour.

EXAMPLE 4

A silane terminated polymer has been prepared by mixing under nitrogen 29.11 g (2.07 mmol) of the product (C) of Example 3 to 0.79 g (4.13 mmol) of 3-mercaptopropyldimethoxymethyl silane (180.34 g/mole) in the presence of 0.1% in weight of DBU. The reaction is carried out at a temperature of 50° C. over 5 hours until the quantitative disappearance of the double bonds.

The product thus obtained has $\eta_{23°\ C.}$=100 Pa·s and has only a slight odour.

EXAMPLE 5

In a pressure reactor, 24.36 g (12.00 mmol) of a polyoxypropylenegliycol diacrylate ($<M_n>$=2030 g/mole) are mixed with 0.368 g (10.80 mmol) of sulphydric acid and approx. 25 g of toluene in the presence of diazadicyclo octane DABCO (0.1% p). It is left to react for approx. 9 hours at a temperature of 70° C. The solvent is removed by evaporation under reduced pressure.

The product thus obtained (D) has $\eta_{23°\ C.}$=96 Pa·s and $<M_n>$=20300 g/mole, and is completely odourless.

The synthesis of the silane terminated polymer is carried out by adding, with agitation under an atmosphere of nitrogen, to 23.56 g (1.16 mol) of (D) 0.456 g (2.32 mol) of 3-mercaptopropyltrimethoxy silane, in the presence of 0.1% by weight of DABCO. The reaction is carried out at T=50° C. over 5 hours until the quantitative disappearance of the double bonds.

The product obtained has $\eta_{23°\ C.}$=165 Pa·s and has only a slight odour.

EXAMPLE 6

In a pressure reactor, 62.3 g (30.49 mmol) of a polyoxypropylene glycol diacrylate ($<M_n>$=2043 g/mole) are mixed with 0.953 g (27.96 mmol) of sulphydric acid and approx. 60 g of toluene, in the presence of the amino catalyst DBU (0.1% by weight). It is left to react with agitation for approx. 8 hours at T=70° C. The solvent is removed by evaporation under reduced pressure.

The product thus obtained (E) has $\eta_{23°\,C.}$=102 Pa·s and $<M_n>$=24800 g/mole, and is completely odourless.

The synthesis of the silane terminated polymer takes place by adding, with agitation and under an atmosphere of nitrogen, to 59.3 g (2.39 mmol) of (E) 0.939 g (4.78 mmol) of 3-mercaptopropyltrimethoxy silane in the presence of 0.1% by weight of DBU. The reaction is carried out at T=50° C. for 5 hours until the quantitative disappearance of the double bonds.

The product obtained has $\eta_{23°\,C.}$=185 Pa·s and has only a slight odour.

EXAMPLE 7

In a pressure reactor, 70.0 g (34.26 mmol) of a polyoxypropylene glycol diacrylate ($<M_n>$=2043 g/mole) are mixed with 1.07 g (31.40 moles) of sulphydric acid and 14 g of a plasticiser (phthalate), in the presence of DBU (0.1% by weight). It is left to react with agitation for approx. 8 hours at a temperature of 70° C.

The product thus obtained (F) has $\eta_{23°\,C.}$=37 Pa·s and $<M_n>$=24820 g/mole; following degassing for a few minutes at low pressure, it is completely odourless.

The synthesis of the silane terminated polymer is carried out by adding, with agitation under an atmosphere of nitrogen, to 65.9 g (2.65 mmol) of the product (F) 1.04 g (5.31 mmol) of 3-mercaptopropyltrimethoxy silane and 0.1% by weight of DBU. The reaction is carried out at T=50° C. over 5 until the quantitative disappearance of the acrylic double bonds.

The product thus obtained has $\eta_{23°\,C.}$=143 Pa·s and has only a slight odour.

EXAMPLE 8

In a pressure reactor, 2672.78 g (0.667 mol) of a polyoxypropylene glycol diacrylate ($<M_n>$=4009.5 g/mole) are mixed with 18.93 g (0.555 mol) of sulphydric acid and with 534 g of a plasticiser (adipate) in the presence of DBU (0.1% by weight). It is left to react with agitation for approx. 8 hours at a temperature of 70° C.

The product thus obtained (G) has $\eta_{23°\,C.}$=33 Pa·s and $<M_n>$=24100 g/mole; following degassing for a few minutes at low pressure it is completely odourless.

The synthesis of the silane terminated polymer is carried out by adding, with agitation and under an atmosphere of nitrogen, to 2389.0 g (0.0991 mol) of product (G) 38.9 g (0.198 mol) of 3-mercaptopropyltrimethoxy silane and approx. 0.1% by weight of DBU. The reaction is carried out with agitation at T=50° C. for 6 hours until the quantitative disappearance of the double bonds.

The product thus obtained has $\eta_{23°\,C.}$=149 Pa·s and has only a slight odour.

EXAMPLE 9

In a pressure reactor, 2672.35 g (1.243 mol) of a polyoxypropylene glycol diacrylate ($<M_n>$=2149 g/mole) are mixed with 47.66 g (1.399 mol) of sulphydric acid in the presence of an amine catalyst (DBU, 0.07% by weight) and approx. 2.5 Kg of toluene. It is left to react for approx. 8 hours at a temperature of 70° C. The solvent is removed by evaporation under reduced pressure.

The product thus obtained (H) has $\eta_{23°\,C.}$=65 Pa·s and $<M_n>$=16300 g/mole (values determined by gel permeation chromatography and polystyrene standards) and has a strong odour.

The synthesis of the silane terminated polymer is carried out by adding, with agitation and under an atmosphere of nitrogen, to 25.77 g (1.58 mmol) of product (H) 0.83 g (3.35 mmol) of γ-methacryloxypropyltrimethoxy silane (247.76 g/mole) and 0.1% by weight of DBU. The reaction is carried out at T=50° C. for 5 hours until the maximum conversion of the methacrylic double bonds ($^1$H-NMR).

The product thus obtained has $\eta_{23°\,C.}$=130 Pa·s and has a moderate odour.

EXAMPLE 10

In a pressure reactor, 36.88 g (0.1154 mol) of trimethylpropane triacrylate (319.51 g/mole) and 2110.26 g (1.045 mol) of a polyoxypropylene glycol diacrylate ($<M_n>$=2020.2 g/mole) are mixed with 35.6 g (1.045 mol) of sulphydric acid in the presence of 3.8 g of an amine catalyst (DBU) and approx. 3 l of toluene. It is left to react for approx. 8 hours at a temperature of 70° C. The solvent is removed by evaporation at reduced pressure.

The product thus obtained, branched and on average trifunctional, (I) has $<M_n>$=19700 g/mole (values determined by titration of the acrylic bonds) and is substantially odourless.

The synthesis of the silane terminated polymer is carried out by adding, with agitation and under an atmosphere of nitrogen, to 1536.5 g (78.0 mmol) of the product (I) 45.9 g (234 mmol) of 3-mercaptopropyltrimethoxy silane and 0.1% by weight of DBU. The reaction is carried out at T=50° C. for 6 hours until the disappearance of the acrylic double bonds ($^1$H-NMR).

The product thus obtained has $\eta_{23°\,C.}$=180 Pa·s and has a slight odour.

EXAMPLE 11

100 parts by weight of the Michael polyaddition polymer (examples: 1-10) are mixed with 100 parts of calcium carbonate, 10 parts of titanium dioxide, 0.5 parts of an antioxidant, 1.0 part of an amine catalyst and with a polyamidic wax in varying quantity. The mixing is carried out in a planetary machine under anhydrous conditions and in an atmosphere of nitrogen. The product in the, form of a thixotropic fluid is degassed and placed in metallic cartridges in which it maintains its fluid form.

The product upon exposure to atmospheric humidity forms an elastic and non sticky film in less than an hour (as a function of the amount of catalyst added) and cures completely in less than 24 hours.

The cured product has the following mechanical properties:

Hardness shore A=25, Elongation to rupture >200% and Module at 100%=0.5 MPa.

COMPARATIVE EXAMPLES

Example A

In a round bottomed reaction flask, 80.19 g (38.83 mmol) of a polyoxypropylene glycol diacrylate ($<M_n>$=2060.5 g/mol) are mixed with 3.747 g (34.62 mmol) of 1,3-propane dithiol (108.23 g/mol, 99% purity) in the presence of 0.1% by weight of DBU reaction catalyst. It is left to react with agitation at a temperature of 65° C. for approx. 12 hours.

The product thus obtained (α) has $\eta_{23°\,C.}$=112 Pa·s and $<M_n>$=19220 g/mol (values determined by titration with n-dodecylmercaptan) and has a strong, highly unpleasant, odour.

The synthesis of the silane terminated polymer takes place by adding, with agitation and under an atmosphere of nitrogen, to 73.33 g. (3.82 mmol) of (α) 1.498 g (7.63 mmol) of 3-mercaptopropyltrimethoxy silane and 0.1% by weight of DBU. The reaction proceeds at T=50° C. over 5 h, until the quantitative disappearance of the acrylic double bonds (the $^{1}$H-NMR spectrum gives confirmation).

The product obtained has $\eta_{23°\,C.}$=165 Pa·s and has a strong, highly unpleasant, odour.

Example B

In a round bottomed reaction flask, 70.13 g (34.03 mmol) of a polyoxypropylene glycol diacrylate ($<M_n>$=2060.5 g/mol) are mixed with 3.27 g (30.21 mmol) of 1,3-propane dithiol in the presence of 14.03 g of a plasticiser (adipate) and DBU (0.1% by weight). It is left to react under agitation for approx. 10 hours at a temperature of 70° C.

The product thus obtained (β) has $\eta_{23°\,C.}$=22 Pa·s and $<M_n>$=19150 g/mol and has a strong, highly unpleasant, odour.

The synthesis of the silane terminated polymer takes place by adding, under agitation and under an atmosphere, of nitrogen, to 60.28 g (3.15 mmol) of (β) 1.24 g (6.30 mmol) of 3-mercaptopropyltrimethoxy silane and 0.1% in by weight of DBU. The reaction proceeds at T=50° C. for 5 hours, until the quantitative disappearance of the double bonds.

The product obtained has $\eta_{23°\,C.}$=98 Pa·s and has a strong, highly unpleasant, odour.

Example C

In a round bottomed reaction flask, 75.52 g (36.65 mmol) of a polyoxypropylene glycol diacrylate ($<M_n>$=2060.5 g/mole) are mixed with 3.529 g (32.61 mmol) of 1,3-propane dithiol and approx. 75 g of toluene in the presence of DBU (0.1% by weight). It is left to react under agitation for approx. 10 hours at a temperature of 65° C. The solvent is removed by evaporation under reduced pressure.

The product thus obtained (γ) has $\eta_{23°\,C.}$=74 Pa·s and $<M_n>$=19303 g/mol and has a slight odour.

The synthesis of the silane terminated polymer takes, place by adding to 69.7 g (3.61 mmol) of (γ) 1.42 g (7.22 mmol) of 3-mercaptopropyltrimethoxy silane and 0.1% by weight of DBU. The reaction proceeds at T=50° C. under agitation and under an atmosphere, of nitrogen for 5 hours until the quantitative disappearance of the double bonds.

The product obtained has a viscosity equal to 150 Pa·s and has a slight odour.

Example D

In a round bottomed reaction flask, 30.18 g (14.04 mmol) of a polyoxypropylene glycol diacrylate ($<M_n>$=2149 g/mol) are mixed with 1.176 g (12.48 mmol) of 1,2-ethane dithiol (94.2 g/mol, 98% purity) in the presence of 0.1% by weight of DBU reaction catalyst. It is left to react under agitation at a temperature of 65° C. for approx. 12 hours.

The product thus obtained (δ) has $\eta_{23°\,C.}$=66 Pa·s and $<M_n>$=21122 g/mol (values determined by titration with n-dodecylmercaptan) and has a strong, highly unpleasant, odour.

The synthesis of the silane terminated polymer takes place by adding, under agitation and under an atmosphere of nitrogen, to 25.43 g (1.20 mmol) of (δ) 0.472 g (2.41 mol) of 3-mercaptopropyltrimethoxy silane and 0.1% by weight of DBU. The reaction proceeds at T=50° C. over 5 h, until the quantitative disappearance of the acrylic double bonds (the $^{1}$H-NMR spectrum gives confirmation).

The product obtained has $\eta_{23°\,C.=}$110 Pa·s and has a very strong, highly unpleasant, odour.

Odour Evaluation

The odour evaluations have been carried out on pure silane terminated Michael polyaddition polymers and on the products added of all the ingredients necessary for the preparation of an adhesive or sealant, that is of the finished product such as that manipulated by the end user. The evaluation of the polymer, as it is, is very important because the presence of unpleasant odours makes the industrial stage of the process problematic for producing adhesives and sealants and, therefore, its marketing to specialised companies in these types of production.

Therefore, each of the polymers synthesised has been evaluated for odours, using the following scale: 4=very strong odours, 3=strong odours, 2=moderate odours, 1=slight odours; 0=substantially odourless.

The polymer described in the U.S. Pat. No. 6,221,994 in Example 2 has been used as a reference. This polymer (the "reference polymer") has an odour value equal to 4.

The polymer synthesised in the Comparative Example C has an odour equal to 2, these synthesised in the Comparative Examples A and B have odours equal to 3, whilst that obtained by the Comparative Example D has an odour equal to 4.

The following results have been obtained for the pure silane terminated Michael polyaddition polymers, i.e. devoid of further loads, subject of the present invention:

| | Polymers of example n°: | | | | | | | | | |
|---|---|---|---|---|---|---|---|---|---|---|
| | 1 | 2 | 3 | 4 | 5 | 6 | 7 | 8 | 9 | 10 |
| Odour | 1 | 1 | 1 | 1 | 1 | 1 | 1 | 1 | 2 | 1 |

All the silane terminated Michael polyaddition polymers have a slight odour derived from 3-mercaptopropyltrimethoxy silane, except that reported in Example 9 which is synthesised with an excess of sulphydric acid and the odour of which derives from an incomplete elimination of the excess gas.

Every polymer prepared as per the Examples 1-10 has been added to by mineral loads, plasticisers and catalysts as reported in Example 11 and has been evaluated for odours. The product described in U.S. Pat. No. 6,221,994 in Example 5 has been used as a reference. This product (the "reference product") has ah odour value equal to 2.

| | Products of Example n° 11: | | | | | | | | | |
|---|---|---|---|---|---|---|---|---|---|---|
| | 1 | 2 | 3 | 4 | 5 | 6 | 7 | 8 | 9 | 10 |
| Odour | 0 | 0 | 0 | 0 | 0 | 0 | 0 | 0 | 1 | 0 |

All the products are substantially odourless, except the product of Example n°9, which has a slight odour.

The invention claimed is:

1. A mono component hydrosetting sealant containing as the base compound a silane terminated polymer obtained by addition reaction between an organic derivative of silicon and the terminal functional groups of linear or branched polymers obtained by the Michael polyaddition reaction of sulphydric acid ($H_2S$) with organic compounds which can contain a repeating unit and hence have variable molecular weigh which have at least two alkenyl double bonds activated by the presence, in the alpha position with respect to each alkylenic bond, of an electronegative group and selected from the group consisting of:

$$W'[-C(R^7)=CH_2]_2 \tag{9}$$

$$Q[-W-C(R^7)=CH_2]_2 \tag{9a}$$

$$Q[-W-C(R^7)=CH_2]_3 \tag{9b}$$

$$Q[-W-C(R^7)=CH_2]_4 \tag{9c}$$

wherein:
W'= electron-attractor group selected from the group consisting of:
—SO—, —SO$_2$—, —O—, —CO—,
W= electron-attractor group selected from the group consisting of:
—SO—, —SO$_2$—, —O—, —CO—, —O—CO—;
$R^7$=—H or —CH$_3$;
Q =divalent, trivalent or tetravalent group selected from the group consisting of hydrocarbon radicals, hetero-hydrocarbon radicals, polyethers, polyesters;
n =an integer greater than or equal to 1;
thereby obtaining:
i) in case (n+1) moles of the compound of formula (9) are reacted with n moles of $H_2S$, the following linear polymer (9')

$$CH_2=C(R^7)-[W'-CH(R^7)-CH_2-S-CH_2-CH(R^7)]_n-W'-C(R^7)=CH_2 \tag{9'}$$

ii) in case n moles of the compound of formula (9) are reacted with (n+1) moles of $H_2S$, the following linear polymer (9")

$$HS-[CH_2CH(R^7)-CH_2-W'-CH(R^7)-CH_2-S-]_n-H \tag{9"}$$

iii) in case (n+1) moles of the compound of formula (9a) are reacted with n moles of $H_2S$, the following linear polymer (9a')

$$CH_2=C(R^7)-[W-Q-W-CH(R^7)-CH_2-S-CH_2-CH(R^7)]_n-W-Q-W-C(R^7)=CH_2 \tag{9a'}$$

iv) in case n moles of the compound of formula (9a) are reacted with (n+1) moles of $H_2S$, the following linear polymer (9a")

$$HS-[CH_2-CH(R^7)-W-Q-W-CH(R^7)-CH_2-S]_n-H \tag{9a"}$$

v) in case (n+1) moles of the compound of formula (9b) are reacted with n moles of $H_2S$, the following polymer (9b')

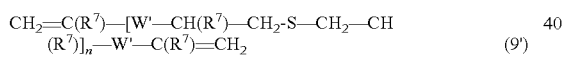

vi) in case n moles of the compound of formula (9b) are reacted with (n+1) moles of $H_2S$, the following polymer (9b")

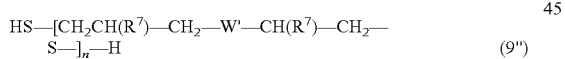

vii) in case (n+1) moles of the compound of formula (9c) are reacted with n moles of $H_2S$, the following polymer (9c')

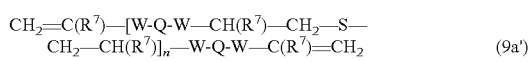

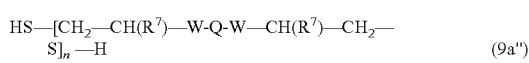

viii) in case n moles of the compound of formula (9c) are reacted with (n+1) moles of $H_2S$, the following polymer (9c")

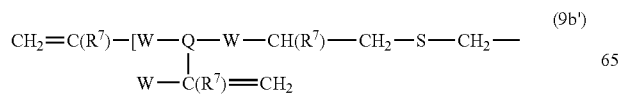

2. The sealant of claim 1 in which the organic derivative of silicon has the general formula (1):

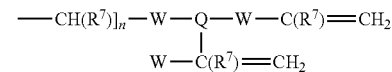

with a=0,1,2; b=0,1 and wherein:
X=selected from the group consisting of halogen, alkoxy, acyloxy, ketoxime, amine, amide and mercaptan radicals;

$R^1$=monovalent hydrocarbon group;
$R^2$=divalent substituents selected from the group consisting of hydrocarbon, radicals;
Z=substituents selected from the group consisting of:

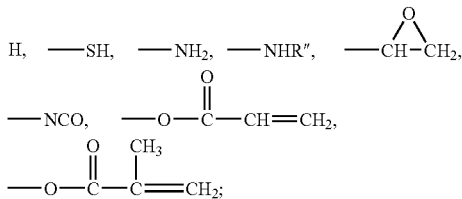

in which R″ represents a monovalent hydrocarbon group.

3. The sealant of claim 2 in which the organic compounds of silicon of formula (1) are selected from the group consisting of:

(Isocyanate alkyl)alkoxysilanes:

 (1a)

(Aminoalkyl)alkoxysilanes:

 (1b)

(Glycidoxyalkyl)alkoxysilanes:

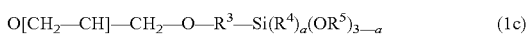 (1c)

(Mercaptoalkyl)alkoxysilanes:

 (1d)

([metha]acrylate alkyl)alkoxysilanes:

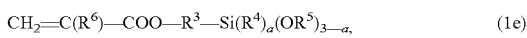 (1e)

wherein:
$R^3$=divalent alkyl radical containing from 1 to 8 carbon atoms;
$R^4$ and $R^5$=alkyl radicals from 1 to 4 carbon atoms;
$R^6$ =H or $CH_3$;
a=0,1,2.

4. The sealant of claim 3 in which the organic compounds of silicon are selected from the group consisting of:
(3-mercaptopropyl)trimethoxysilane;
(3-mercaptopropyl)methyldimethoxysilane;
(3-[metha]acryloxypropyl)trimethoxysilane;
(3-acryloxypropyl)trimethoxysilane;
(N-nButyl,3-aminopropyl)trimethoxysilane;
(N-Ethyl,3-aminoisobutyl)methyldiethoxysilane;
(3-glycidoxypropyl)trimethoxysilane.

5. The sealant of claim 1 in which the organic compounds having at least two activated double bonds, are selected from the group consisting of: di-, tri-, tetra-acrylates; di-, tri- and tetra-methacrylates; di-, tri- and tetra-vinylsulphones.

6. The sealant of claim 5 in which the organic compounds useful for Michael polyaddition, having at least two activated double bonds, are composed of organic acrylate and/or methacrylates of general formula:

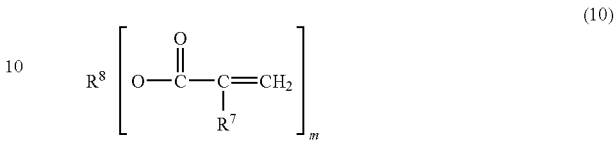 (10)

wherein m=2,3,4; $R^7$=H or $CH_3$; $R^8$ is selected from the group consisting of: di, tri or tetravalent polyethers which consist essentially of chemically combined —$OR^9$— units, wherein $R^9$ is a divalent alkyl group having from 2 to 4 carbon atoms; di-, tri- or tetra-valent linear or branched aliphatic alkyl radicals, from 1 to 50 carbon atoms; di-, tri- or tetra-valent aromatic radicals, from 6 to 200 carbon atoms; di-, tri- or tetravalent linear or branched aryl radicals, from 6 to 200 carbon atoms; or $R^8$ is one or more combinations of said polyethers, alkyl radicals, aromatic radicals, aryl radicals.

7. The sealant of claim 6 in which the di-acrylate and di-methacrylate organic compounds are selected from the group consisting of:

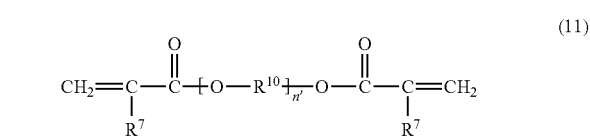 (11)

compounds of formula (11)
wherein
$R^7$=H or $CH_3$; $R^{10}$=selected from the group consisting of —$CH_2$—$CH(CH_3)$—, —$CH_2$—$CH_2$—, —$CH_2$—$CH_2$—$CH_2$—$CH_2$—, —$CH_2$—$CH(CH_3)$—$CH_2$—,
n'=integer comprised of between 1 and 400;
compounds of formula (12):

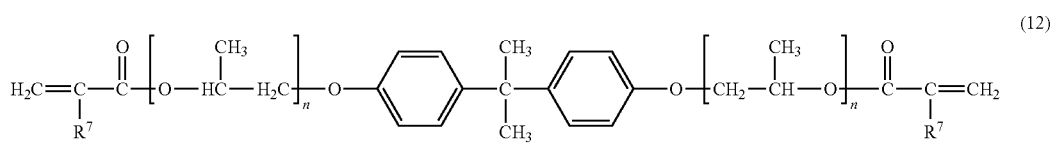 (12)

wherein n is an integer comprised of between 0 and 10 and $R^7$ is H or $CH_3$.

8. The sealant of claim 6 in which the di-acrylate organic compounds are the polyisopropylene glycol diacrylates.

9. The sealant of claim 5 in which the tri-acrylate and tri-methacrylate organic compounds are:

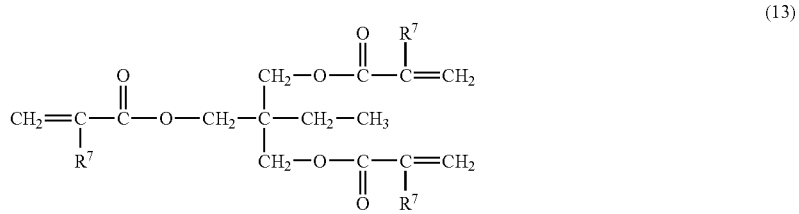

(13)

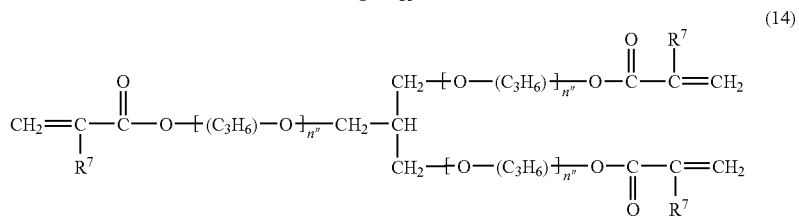

(14)

wherein:
$R^7$=H or $CH_3$; n″=an integer comprised of between 0 and 400.

10. The sealant of claim 5 in which the vinyl-sulphonic organic compounds are:

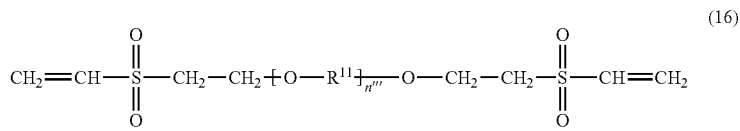

(16)

wherein: $R^{11}$ is selected from the group consisting of —$CH_2$—$CH(CH_3)$—, —$CH_2$—$CH_2$—, —$CH_2$—$CH_2$—$CH_2$—$CH_2$—, —$CH_2$—$CH(CH_3)$ —$CH_2$—, n′″=an integer comprised of between 0 and 400.

11. The sealant of claim 1 wherein the base compound silane terminated polymer is prepared by the process comprising:
   a) carrying out a polyaddition Michael reaction in the presence of an organic base as the catalyst between of sulphydric acid ($H_2S$) with organic compounds which have at least two alkylenic double bonds activated by the presence, in the alpha position with respect to each alkylenic bond, of an electronegative group, and
   b) reacting the linear or branched polymer obtained in step (a) with an organic silicon compound.

12. The sealant of claim 11 in which the organic bases are tertiary amines.

13. The sealant of claim 12 in which the tertiary amines are selected from the group consisting of: triethylamine, 1,8-diazadicyclo[5.4.0.]undecene-7 (DBU), 1,4-diazadicyclo[2.2.2]octane (DABCO).

14. The sealant of claim 13 in which the tertiary amine is 1,8-diazadicyclo[5.4.0.]undecene-7 (DBU).

* * * * *

UNITED STATES PATENT AND TRADEMARK OFFICE
CERTIFICATE OF CORRECTION

PATENT NO. : 7,563,859 B2
APPLICATION NO. : 10/509310
DATED : July 21, 2009
INVENTOR(S) : Galbiati et al.

Page 1 of 1

It is certified that error appears in the above-identified patent and that said Letters Patent is hereby corrected as shown below:

Column 7, line 64, Delete "With" and substitute therefor

-- with --.

Column 10, line 46, Delete "H2C-C" and substitute therefor

-- H2C=C ... --.

Column 12, line 7, Formula 11, Delete "CH2-CH;" and substitute therefor

-- CH2-CH2; --.

Column 15, line 13, After "point", insert therefor

-- ) --.

Column 18, line 64, Delete "Theological" and substitute therefor

-- rheological --.

Column 21, line 32, After "5", insert therefor

-- hours --.

Signed and Sealed this

Twenty-sixth Day of January, 2010

David J. Kappos
*Director of the United States Patent and Trademark Office*